(12) United States Patent
Zhang et al.

(10) Patent No.: US 11,014,742 B2
(45) Date of Patent: May 25, 2021

(54) METHOD AND DEVICE FOR COLLECTING GARBAGE

(71) Applicant: Beijing Xiaomi Mobile Software Co., Ltd., Beijing (CN)

(72) Inventors: Ximing Zhang, Beijing (CN); Han Wang, Beijing (CN); Jin Han, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 71 days.

(21) Appl. No.: 16/222,815

(22) Filed: Dec. 17, 2018

(65) Prior Publication Data
US 2020/0039741 A1 Feb. 6, 2020

(30) Foreign Application Priority Data
Aug. 3, 2018 (CN) .......................... 201810878263.0

(51) Int. Cl.
| B65F 1/00 | (2006.01) |
| G01C 21/20 | (2006.01) |
| G01C 21/36 | (2006.01) |
| G05B 13/02 | (2006.01) |
| G06K 9/00 | (2006.01) |

(Continued)

(52) U.S. Cl.
CPC .............. *B65F 1/0033* (2013.01); *B65F 1/06* (2013.01); *G01C 21/20* (2013.01); *G01C 21/3629* (2013.01); *G05B 13/0265* (2013.01); *G06K 9/00791* (2013.01); *B65F 2001/008* (2013.01); *B65F 2210/138* (2013.01); *B65F 2210/139* (2013.01); *B65F 2210/168* (2013.01); *B65F 2210/176* (2013.01); *B65F 2210/184* (2013.01); *H04L 67/12* (2013.01)

(58) Field of Classification Search
USPC ......................................................... 701/428
See application file for complete search history.

(56) References Cited

U.S. PATENT DOCUMENTS

| 2001/0033639 A1* | 10/2001 | Martin ................ H04M 3/5307 379/88.14 |
| 2014/0278630 A1* | 9/2014 | Gates ................. G06Q 10/0832 705/7.13 |

(Continued)

FOREIGN PATENT DOCUMENTS

| CN | 205203938 U | 5/2016 |
| CN | 106241111 A | 12/2016 |

(Continued)

OTHER PUBLICATIONS

Extended European Search Report dated Jun. 7, 2019 in Patent Application No. 19169828.1, 8 pages.

(Continued)

*Primary Examiner* — Tyler D Paige
(74) *Attorney, Agent, or Firm* — Oblon, McClelland, Maier & Neustadt, L.L.P.

(57) ABSTRACT

The disclosure relates to a method and a device for collecting garbage. The method includes acquiring a garbage type of garbage to be collected; determining a garbage collector for recycling garbage of the garbage type; and controlling the garbage collector to output a first prompt message to prompt a user to put the garbage to be collected into the garbage collector.

15 Claims, 10 Drawing Sheets

(51) Int. Cl.
*B65F 1/06* (2006.01)
*H04L 29/08* (2006.01)

(56) References Cited

U.S. PATENT DOCUMENTS

| | | | |
|---|---|---|---|
| 2016/0232498 A1* | 8/2016 | Tomlin, Jr. | G06Q 30/0206 |
| 2017/0011580 A1 | 1/2017 | Huang et al. | |
| 2017/0116583 A1* | 4/2017 | Rodoni | G06Q 40/12 |
| 2019/0019167 A1* | 1/2019 | Candel | G06Q 10/30 |
| 2019/0339112 A1* | 11/2019 | Balachandran | G01G 19/021 |
| 2020/0219119 A1* | 7/2020 | Frybarger | B30B 15/26 |

FOREIGN PATENT DOCUMENTS

| | | |
|---|---|---|
| CN | 106548605 A | 3/2017 |
| CN | 206032298 U | 3/2017 |
| CN | 106742909 A | 5/2017 |
| CN | 107054936 A | 8/2017 |
| CN | 108182455 A | 6/2018 |
| WO | WO 2015/120384 A1 | 8/2015 |

OTHER PUBLICATIONS

The first Office Action of Chinese Patent Application No. 201810878263.0, from the CNIPA, dated Dec. 8, 2020.

* cited by examiner

METHOD AND DEVICE FOR COLLECTING GARBAGE

CROSS-REFERENCE TO RELATED APPLICATIONS

This application is based on and claims priority to Chinese Patent Application No. 201810878263.0, filed on Aug. 3, 2018, the entire contents of which are incorporated herein by reference.

TECHNICAL FIELD

The present disclosure relates to the field of smart home technology, and more particularly to a method and a device for collecting garbage.

BACKGROUND

Garbage classification is beneficial to the recycling and utilization of resources and reducing environmental pollution. However, due to lack of knowledge about garbage classification and the indifference of energy conservation and environmental protection, people cannot effectively identify the class of garbage, and recyclable and non-recyclable garbage is often put together into a trash can, which may cause great inconvenience for subsequent garbage sorting, and may also cause a significant waste of resources.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for collecting garbage. The method includes acquiring a garbage type of garbage to be collected; determining a garbage collector for recycling garbage of the garbage type; and controlling the garbage collector to output a first prompt message to prompt a user to put the garbage to be collected into the garbage collector.

According to an aspect, prior to controlling the garbage collector to output the first prompt message, the method further includes acquiring a location of the garbage to be collected; acquiring a current location of the garbage collector; determining a distance between the location of the garbage to be collected and the current location of the garbage collector; when the distance between the location of the garbage to be collected and the current location of the garbage collector is determined to be greater than a preset distance threshold, determining a moving path of the garbage collector based on the current location of the garbage collector and the location of the garbage to be collected; and controlling the garbage collector to move to the location of the garbage to be collected based on the moving path.

According to another aspect, when acquiring the garbage type of the garbage to be collected, the method further includes receiving an indication message that includes the garbage type of the garbage to be collected; and/or acquiring an image including the garbage to be collected, and identifying, through an image recognition algorithm, the garbage type of the garbage to be collected in the image.

According to yet another aspect, the method further includes, when detecting that garbage in the garbage collector satisfies a preset cleaning condition, controlling the garbage collector to move to a preset garbage collection location; and/or controlling the garbage collector to output a second prompt message, wherein the second prompt message prompts dumping the garbage in the garbage collector or replacing a garbage bag in the garbage collector.

According to yet another aspect, when detecting that the garbage in the garbage collector satisfies the preset cleaning condition, the method further includes, when weight of the garbage in the garbage collector reaches a preset weight threshold, and/or volume of the garbage in the garbage collector reaches a preset volume threshold, determining that the garbage in the garbage collector satisfies the preset cleaning condition.

In an example, when controlling the garbage collector to output the first prompt message, the method further includes one or more of controlling a light in the garbage collector to flash, controlling the garbage collector to output a text prompt message, controlling the garbage collector to make a voice prompt message, and/or controlling the garbage collector to open a cover.

According to an aspect, the method further includes acquiring a frequency of the user using the garbage collector, through a preset deep learning model and based on a frequency of outputting the first prompt message; determining a time point at which a third prompt message is to be output based on the frequency of the user using the garbage collector, the third prompt message prompting the user to purchase a garbage bag; and when detecting that the time point has been reached, outputting the third prompt message.

Aspects of the disclosure also provide a device for collecting garbage. The device includes a processor and a memory for storing instructions executable by the processor. The processor is configured to acquire a garbage type of garbage to be collected; determine a garbage collector for recycling garbage of the garbage type; and control the garbage collector to output a first prompt message to prompt a user to put the garbage to be collected into the garbage collector.

Aspects of the disclosure also provide a non-transitory computer-readable medium storing instructions that, when executed by one or more processors of a device, cause the device to acquire a garbage type of garbage to be collected; determine a garbage collector for recycling garbage of the garbage type; and control the garbage collector to output a first prompt message to prompt a user to put the garbage to be collected into the garbage collector.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
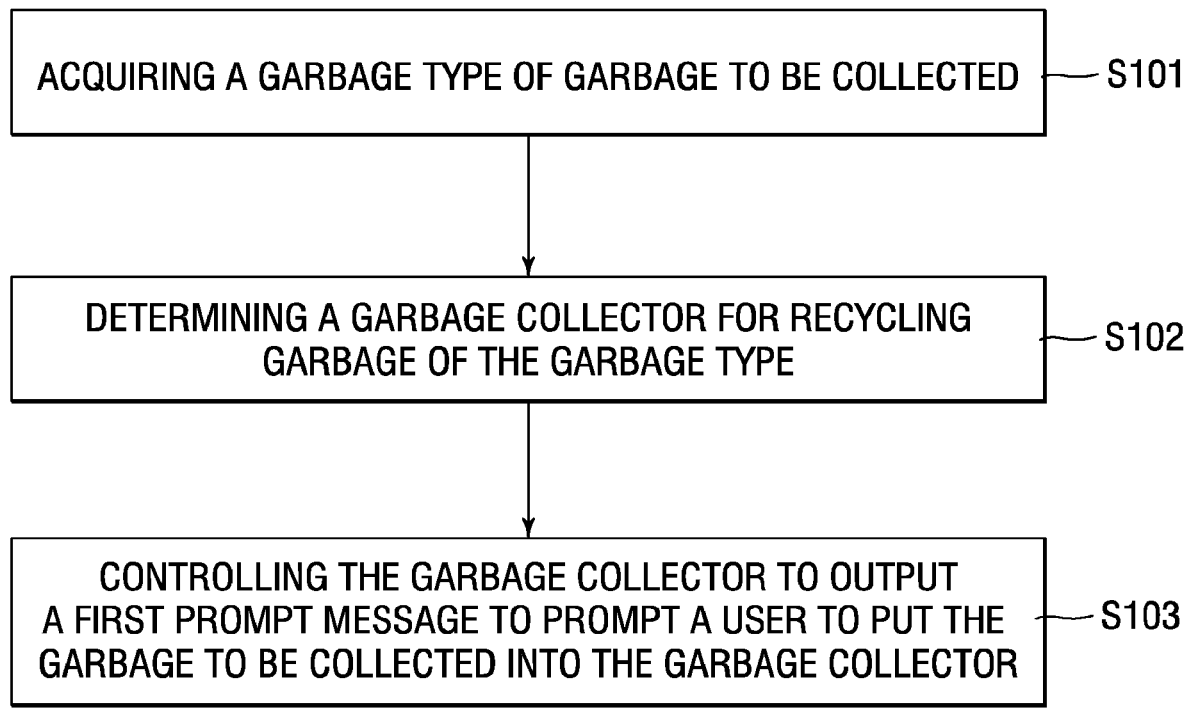
FIG. 1 is a flow chart illustrating a method for recycling garbage according to an exemplary aspect of the present disclosure.

FIG. 1 is a flow chart illustrating a method for recycling garbage according to an exemplary aspect. As shown in FIG. 1, the method includes the following steps S101-S103.

In step S101, a garbage type of garbage to be collected is acquired.

In step S102, a garbage collector for recycling garbage of the garbage type is determined.

In step S103, the garbage collector is controlled to output a first prompt message to prompt a user to put the garbage to be collected into the garbage collector.

There are many types of garbage, for example, garbage may be divided into domestic garbage, construction garbage, decoration garbage, industrial garbage, medical waste, and the like. Domestic garbage may be further divided into two types: "recyclable garbage" and "non-recyclable garbage". Generally, non-recyclable garbage accounts for the vast majority, and non-recyclable garbage can be divided into three types: "degradable garbage", "non-degradable garbage" and "harmful garbage". Different types of garbage are recycled in different ways. If the same recycling method is adopted for different types of garbage, the recycling rate and utilization rate will be reduced, and the environment will be polluted. Taking napkins and ultra-thin plastic bags as examples, both are domestic garbage and the main source of white pollution. The napkin is degradable garbage, and the plastic bag is non-degradable garbage. Therefore, the way of recycling the napkin and the way of recycling the plastic bag are different.

At present, there is a problem that the classification of garbage is unclear, and the garbage cannot be classified reasonably, resulting in a decrease in the recycling rate and utilization rate of resources; and environmental pollution problems are increasing year by year. In the present disclosure, in order to improve the recycling rate and utilization rate of resources, and reduce the environmental pollution, a garbage type of garbage to be collected is acquired, a garbage collector for recycling garbage of the garbage type is determined according to the garbage type, and then the garbage collector is controlled to output a first prompt message to prompt a user to put the garbage to be collected into the garbage collector. In this way, it can avoid a mistake in sorting garbage, and it can improve the recycling rate and utilization rate of resources, and reduce the environmental pollution.

For example, if the garbage to be collected is a battery, then the garbage type of garbage to be collected is harmful garbage. According to the type of harmful garbage, a garbage collector for recycling harmful garbage is determined. When the garbage collector is determined, the determined garbage collector is controlled to output a first prompt message to prompt a user to put the battery in the garbage collector without requiring the user to determine which garbage collector the battery should be put in, which otherwise would make the user feel troublesome and would leave the battery in any garbage collector and result in environment pollution.

The garbage collector can be, for example, a trash can.

The technical solution provided by the aspect of the present disclosure may include the following benefits. A garbage type of garbage to be collected is acquired, a garbage collector for recycling garbage of the garbage type is determined, and the garbage collector is controlled to output a first prompt message to prompt a user to put the garbage to be collected into the garbage collector. It can effectively avoid a mistake in sorting garbage, improve the classification and recycling rate of garbage, thereby effectively improving the recycling rate and utilization rate of resources, and reducing environmental pollution.

When the garbage collector is at the user's side, the user can directly put the garbage into the determined garbage collector, but it is also possible that the determined garbage collector is not in the vicinity of the user. In this case, in an aspect, before the above step S103, the following steps A1-A4 may also be included.

In step A1, a location of the garbage to be collected is acquired.

In step A2, a current location of the garbage collector is acquired.

In step A3, when detecting that a distance between the location of the garbage to be collected and the current location of the garbage collector is greater than a preset distance threshold, a moving path of the garbage collector is determined according to the current location of the garbage collector and the location of the garbage to be collected.

In step A4, the garbage collector is controlled to move to the location of the garbage to be collected according to the moving path.

After the garbage collector is determined, the location of the garbage to be collected, and the current location of the garbage collector may be acquired. Then it is detected whether a distance between the location of the garbage to be collected and the current location of the garbage collector is greater than a preset distance threshold. When detecting that the distance between the location of the garbage to be collected and the current location of the garbage collector is greater than the preset distance threshold, a moving path of the garbage collector is determined according to the current location of the garbage collector and the location of the garbage to be collected, and the garbage collector is controlled to move to the location of the garbage to be collected according to the moving path. After the garbage collector is move to the location of the garbage to be collected, the garbage collector is controlled to output the first prompt message. When detecting that the distance between the location of the garbage to be collected and the current location of the garbage collector is less than or equal to the preset distance threshold, the garbage collector is controlled to output the first prompt message.

For example, the preset distance threshold is 0.5 m. When the distance between the location of the garbage to be collected and the current location of the garbage collector is 10 m, since 10 m is greater than 0.5 m, the garbage collector is not in the vicinity of the user, and the user cannot deliver the garbage. At this time, the moving path of the garbage collector may be determined according to the current position of the garbage collector and the position of the garbage to be collected; and the garbage collector is controlled to move to the location of the garbage to be collected according to the moving path. After the garbage collector is move to the location of the garbage to be collected, the garbage collector is controlled to output the first prompt message, thereby facilitating the user to put the garbage into the garbage collector.

The performing entity of the method in the present disclosure may be a terminal device (e.g., a mobile phone) or a garbage collector per se. Acquiring the location of the garbage to be collected may be implemented by the user manually inputting, through the terminal device, the location of the garbage to be collected, or may be implemented by a camera that is built into the garbage collector and acquires the location of the garbage to be collected, or may be implemented by a camera that identifies the location of the garbage to be collected and sends the location to the terminal device or the garbage collector.

Further, determining the moving path of the garbage collector according to the current location of the garbage collector and the location of the garbage to be collected may include: determining the moving path of the garbage collector by means of intelligent linkage, for example, automatically connecting smart hardware devices such as the mobile phone, the wristband, and the likes to plan the moving path.

Conventionally, garbage collectors are generally placed at fixed locations, cannot move by themselves, and people has to go in front of a garbage collector to put garbage in it. In the present disclosure, when the garbage collector is not in the vicinity of the user, the garbage collector can be controlled to move to the vicinity of the user, to facilitate the user to put the garbage, effectively improving the user experience.

Further, an office conventionally provides a corresponding number of garbage collectors according to the area of the office, regardless whether the utilization rate of the garbage collector is reasonable. Therefore, the number of garbage collectors may be too large and the garbage collectors may occupy lots of space. In the present disclosure, there is no need to provide a large number of garbage collectors, but the garbage collector, after being determined, can be controlled to move to the vicinity of the user to facilitate the user to put in garbage, thereby effectively improving the user experience.

In an aspect, the above step S101 includes the following sub-steps B1-B2:

In step B1, an indication message is received, and the indication message carries the garbage type of the garbage to be collected.

In step B2, the garbage type of the garbage to be collected is acquired from the indication message.

The performing entity of the method in the present disclosure may be a terminal device (e.g., a mobile phone) or a garbage collector per se.

When the performing entity is the terminal device, the user can input, through the terminal device, the garbage type of the garbage to be collected. For example, the user can input through a voice command the garbage type of the garbage to be collected, or manually input the garbage type of the garbage to be collected. Further, when the performing entity is a terminal device, an application (APP) for controlling the garbage collector may be set in the terminal device, and then the garbage type of the garbage to be collected may be input through the APP.

After the user inputs the garbage type of the garbage to be collected, a virtual confirmation button may be clicked, and then the indication message may be received. The indication message carries the garbage type of the garbage to be collected, which was input by the user.

The technical solution provided by the aspect of the present disclosure may include the following beneficial effects. The accuracy of the acquired garbage type of the garbage to be collected can be improved, by acquiring the garbage type of the garbage to be collected according to the received indication message.

In an aspect, the above step S101 includes the following sub-steps C1-C2.

In step C1, an image including the garbage to be collected is acquired.

In step C2, the garbage type of the garbage to be collected in the image is identified through an image recognition algorithm.

An image including the garbage to be collected may be acquired by a camera device. For example, an image including the garbage to be collected may be acquired through a camera installed in the home, or an image including the garbage to be collected may be acquired through a camera installed in the public place. In the description in the aspect, an image including the garbage to be collected may be acquired by a camera of the terminal device, or an image including the garbage to be collected may be acquired by a camera disposed on the garbage collector.

The method for identifying through the image recognition algorithm the garbage type of the garbage to be collected in the image is the same as that in the related art, details of which will not be repeated herein.

The technical solution provided by the aspect of the present disclosure may include the following beneficial effects. The accuracy of the acquired garbage type of the garbage to be collected can be effectively improved, by determining the garbage type of the garbage to be collected from the image of the garbage to be collected.

The two implementations of the step S101 described in the above aspects may be performed alternatively or additionally. That is, the two implementations may be performed at the same time, or only one implementation may be performed.

It should be noted that the garbage type of the garbage to be collected can also be acquired by the above-mentioned camera device.

In an aspect, the method further includes the following steps.

When detecting that garbage in the garbage collector satisfies a preset cleaning condition, the garbage collector is controlled to move to a preset garbage collection location.

The garbage collection location may be preset, and the preset garbage collection location may be a garbage storage place of the current floor (such as a large garbage bin). When the garbage in the garbage collector satisfies a preset cleaning condition, that is, the garbage collector is full, the full garbage collector may be further controlled to move to the preset garbage collection location.

Controlling the garbage collector to move to the preset garbage collection location may be implemented as: based on a Global Positioning System (GPS), moving the full garbage collector to a preset garbage collection location.

The technical solution provided by the aspect of the present disclosure may include the following beneficial effects: when detecting that the garbage in the garbage collector satisfies the preset cleaning condition, the garbage collector is controlled to move to the preset garbage collection location, thereby facilitating the user to clean up garbage in the garbage collector.

In an aspect, the method further includes the following steps. When detecting that the garbage in the garbage collector satisfies the preset cleaning condition, the garbage collector is controlled to output a second prompt message, and the second prompt message prompts dumping the garbage in the garbage collector or replacing the garbage bag in the garbage collector.

When detecting that the garbage in the garbage collector satisfies the preset cleaning condition, the performing entity in the above example may output through the APP or the garbage collector a second prompt message to prompt the user to dump the garbage in the garbage collector or replace the garbage bag in the garbage collector.

The technical solution provided by the aspect of the present disclosure may include the following beneficial effects. When detecting that the garbage in the garbage collector satisfies the preset cleaning condition, a second prompt message is output for prompting dumping the garbage in the garbage collector or replacing the garbage bag in the garbage collector. Thus, the user can promptly clean up the garbage in the garbage collector, thereby effectively improving the user experience.

It should be noted that when detecting that the garbage in the garbage collector satisfies the preset cleaning condition, the garbage collector can be controlled to move to the preset garbage collection location, or the garbage collector can also be controlled to output the second prompt message, or the garbage collector can be controlled to move to the preset garbage collection location and output the second prompt message.

In one aspect, the above method further includes the following sub-steps D1-D3.

In step D1, a frequency of the user using the garbage collector is acquired through a preset deep learning model and according to a frequency of outputting the first prompt message.

In step D2, a time point at which a third prompt message is to be output is determined according to the frequency of the user using the garbage collector; and the third prompt message prompts the user to purchase a garbage bag.

In step D3, when detecting that the time point has been reached, the third prompt message is output.

A preset deep learning model can be trained, and the preset deep learning model can predict the frequency of the user using the garbage collector. Then in the aspect of the present disclosure, a frequency of the user using the garbage collector may be acquired through the preset deep learning model and according to the frequency of outputting the first prompt message.

For example, if the frequency of the user using the garbage collector is one replacement every two days, and the number of garbage bags purchased is 10, then the user needs to re-purchase garbage bags after 20 days. If today is June 1, then the time point of the third prompt message as determined may be June 18 to June 21. When detecting that the above time point has been reached, the third prompt message is output to prompt the user to purchase garbage bags. In this aspect, the latest time point for outputting the third prompt message is June 21, and the third prompt message may be output in advance before the latest time point. In this way, the user may be prompted to purchase garbage bags in advance. Therefore, the garbage bag can be replaced in time.

In one aspect, detecting that the garbage in the garbage collector satisfies the preset cleaning conditions includes the following.

When weight of the garbage in the garbage collector reaches a preset weight threshold, and/or volume of the garbage in the garbage collector reaches a preset volume threshold, it is determined that the garbage in the garbage collector satisfies the preset cleaning condition.

That is, when the weight of the garbage in the garbage collector reaches the preset weight threshold, it is determined that the garbage in the garbage collector satisfies the preset cleaning condition; or, when the volume of the garbage in the garbage collector reaches the preset volume threshold, it is determined that the garbage in the garbage collector satisfies the preset cleaning condition; or when the weight of the garbage in the garbage collector reaches the preset weight threshold and the volume of the garbage in the garbage collector reaches the preset volume threshold, it is determined that the garbage in the garbage collector satisfies the preset cleaning condition.

When detecting that the weight of the garbage in the garbage collector reaches the preset weight threshold, it means that the garbage in the garbage collector reaches the preset cleaning condition.

When the volume of the garbage in the garbage collector reaches the preset volume threshold, it means that the garbage in the garbage collector has reached the preset cleaning condition.

The technical solution provided by the aspect of the present disclosure may include the following beneficial effects. The timeliness and accuracy of prompting dumping garbage can be effectively improved, by determining whether the garbage in the garbage collector should be cleaned according to the weight or the volume of the garbage in the garbage collector.

In an aspect, outputting the first prompt message in the step S103 includes one or more of the following manners: by controlling a light in the garbage collector to flash; or by controlling the garbage collector to output a text prompt message; or by controlling the garbage collector to make a voice prompt message; or by controlling the garbage collector to open the cover.

After the garbage collector is determined, in order to let the user learn about that the garbage should be put into the garbage collector, the garbage collector may output the first prompt message, that is, let the garbage collector make an active feedback, for example, by controlling the light in the garbage collector to flash; or by controlling the garbage collector to output a text prompt message; or by controlling the garbage collector to make a voice prompt message; or by controlling the garbage collector to open the cover, and so on.

The technical solution provided by the aspect of the present disclosure may include the following beneficial effects. After the garbage collector is determined, the garbage collector may prompt by various prompting manners the user to throw the garbage into the garbage collector, thereby effectively improving the accuracy of garbage classification.

It should be noted that, in the present disclosure, big data of the user may be formed according to the user's usage habits, to thereby determine other prompt messages according to the big data of the user. For example, according to the frequency of the user using the garbage collector in the big data of the user, the user may be prompted to purchase garbage bags in time, and so on.

The implementations will be described in detail below through several aspects.

Figure 2A:
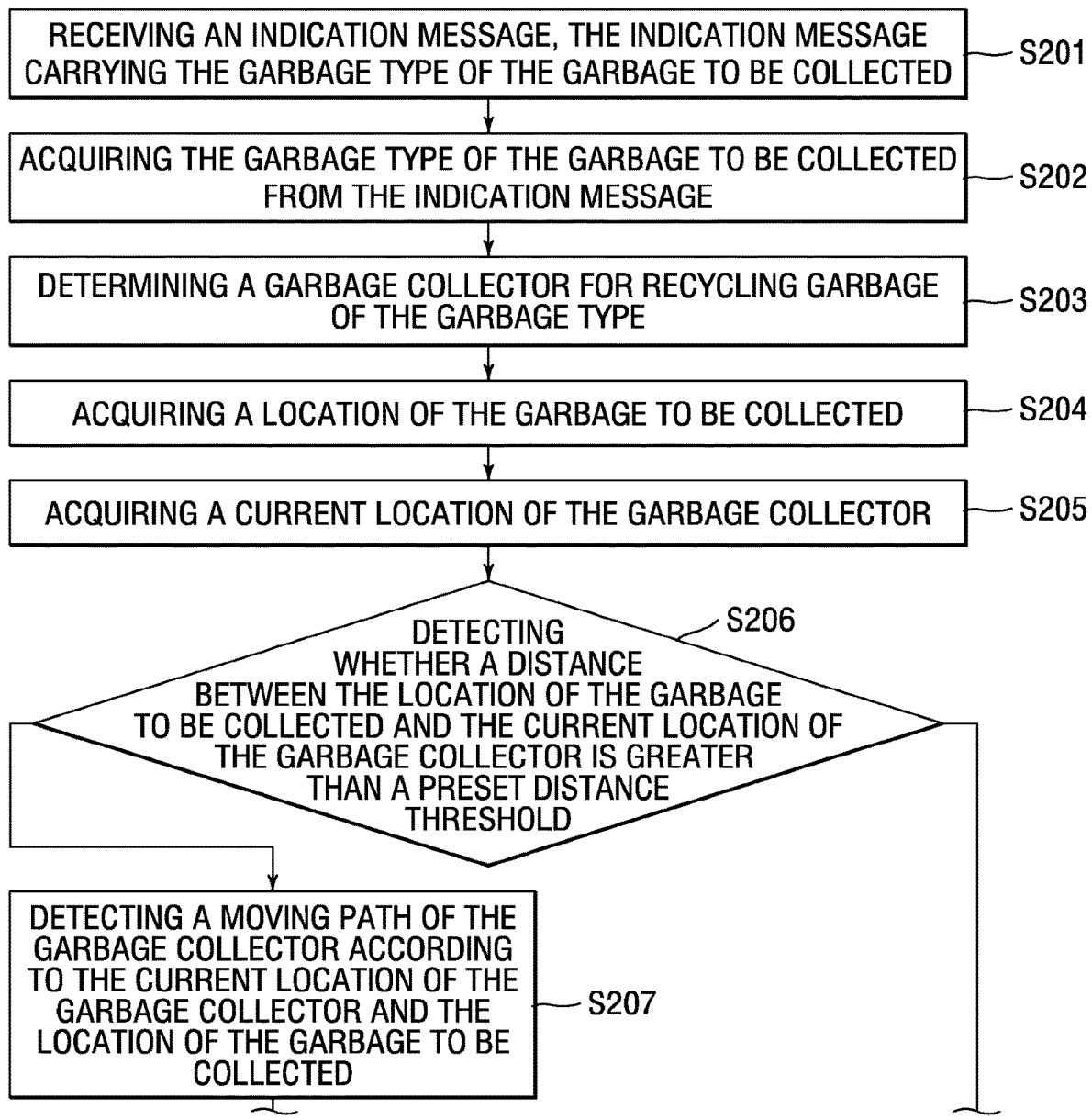
FIGS. 2A and 2B show a flow chart illustrating a method for recycling garbage according to an exemplary aspect of the present disclosure.
Figure 2B:
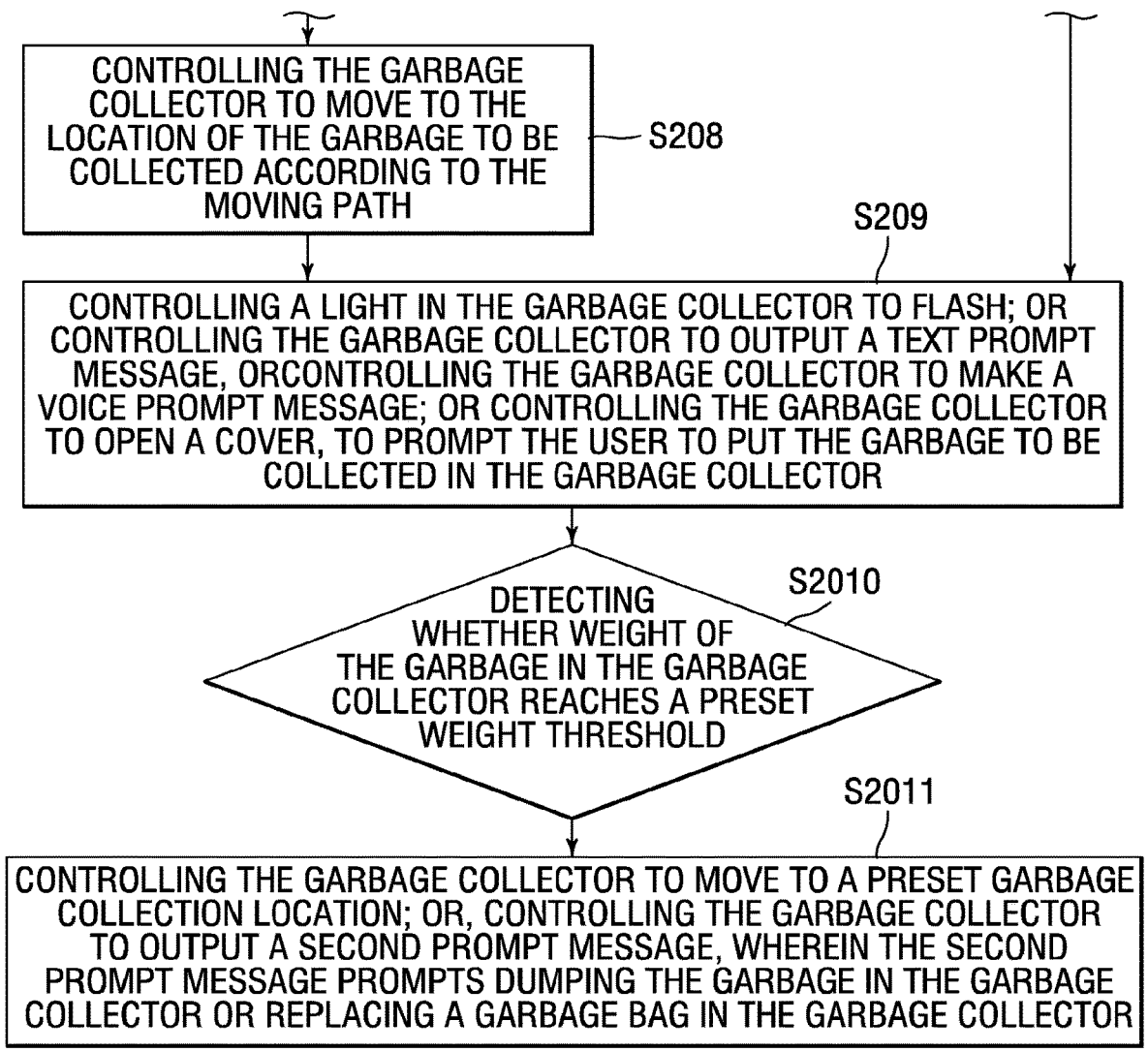

FIGS. 2A and 2B show a flow chart illustrating a method for recycling garbage according to an exemplary aspect. As shown in FIGS. 2A and 2B, the method includes the following steps.

In S201, an indication message is received, and the indication message carries the garbage type of the garbage to be collected.

In S202, the garbage type of the garbage to be collected is acquired from the indication message.

In S203, a garbage collector for recycling garbage of the garbage type is determined.

In S204, a location of the garbage to be collected is acquired.

In S205, a current location of the garbage collector is acquired.

In S206, it is detected whether a distance between the location of the garbage to be collected and the current location of the garbage collector is greater than a preset distance threshold, when detecting that the distance between the location of the garbage to be collected and the current location of the garbage collector is greater than the preset distance threshold, steps S207-S209 are performed; and when detecting that the distance between the location of the garbage to be collected and the current location of the garbage collector is less than or equal to the preset distance threshold, step S209 is performed.

In S207, a moving path of the garbage collector is determined according to the current location of the garbage collector and the location of the garbage to be collected.

In S208, the garbage collector is controlled to move to the location of the garbage to be collected according to the moving path.

In S209, the light in the garbage collector is controlled to flash; or the garbage collector is controlled to output a text prompt message; or the garbage collector is controlled to make a voice prompt message; or the garbage collector is controlled to open the cover, to prompt the user to put the garbage to be collected in the garbage collector.

In S2010, it is detected whether weight of the garbage in the garbage collector reaches a preset weight threshold, when the weight of the garbage in the garbage collector reaches the preset weight threshold, step S2011 is performed.

In S2011, the garbage collector is controlled to move to a preset garbage collection location; or the garbage collector is controlled to output a second prompt message, and the second prompt message prompts dumping the garbage in the garbage collector or replacing the garbage bag in the garbage collector.

Figure 3A:
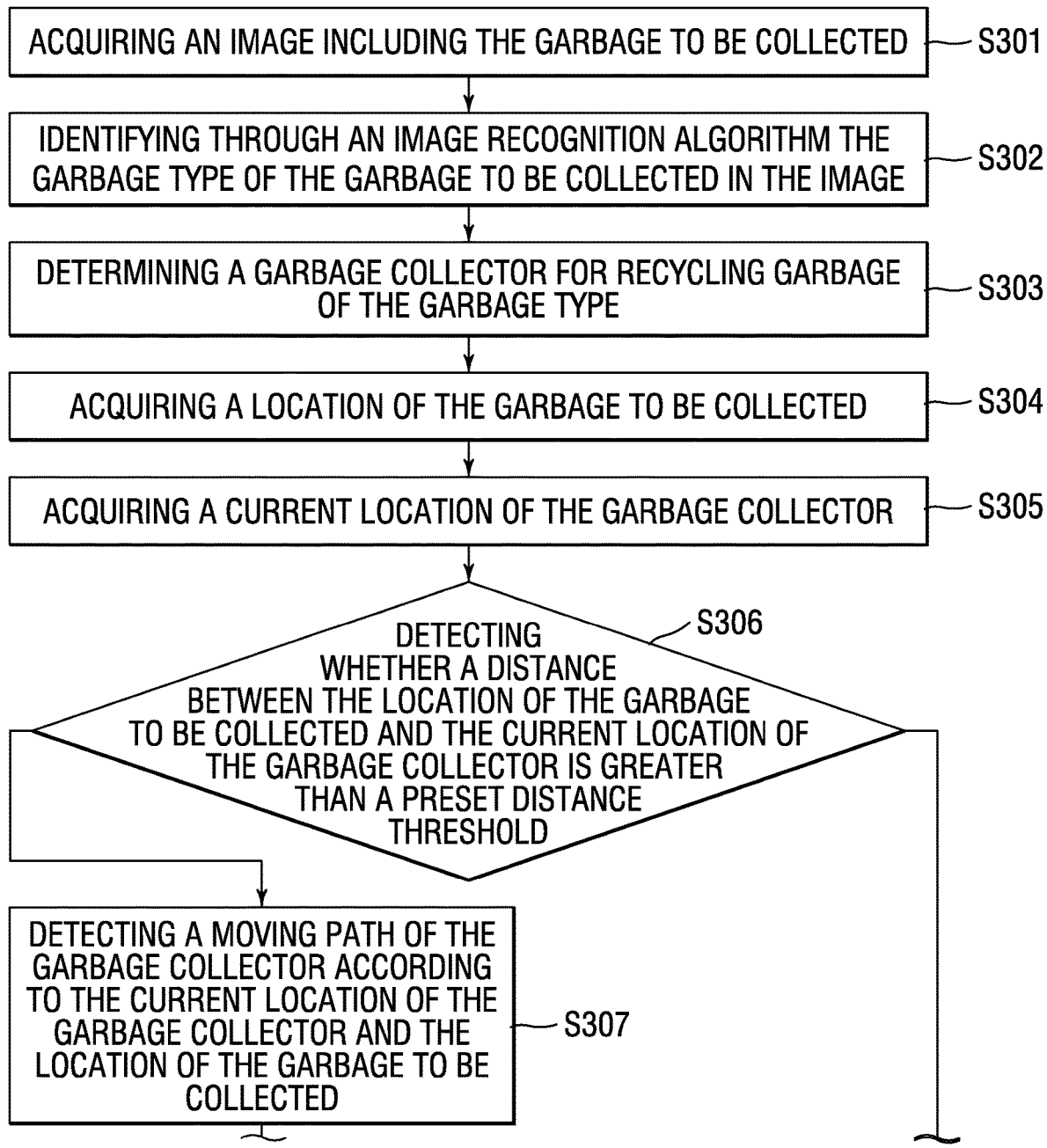
FIGS. 3A and 3B show a flow chart illustrating a method for recycling garbage according to an exemplary aspect of the present disclosure.
Figure 3B:
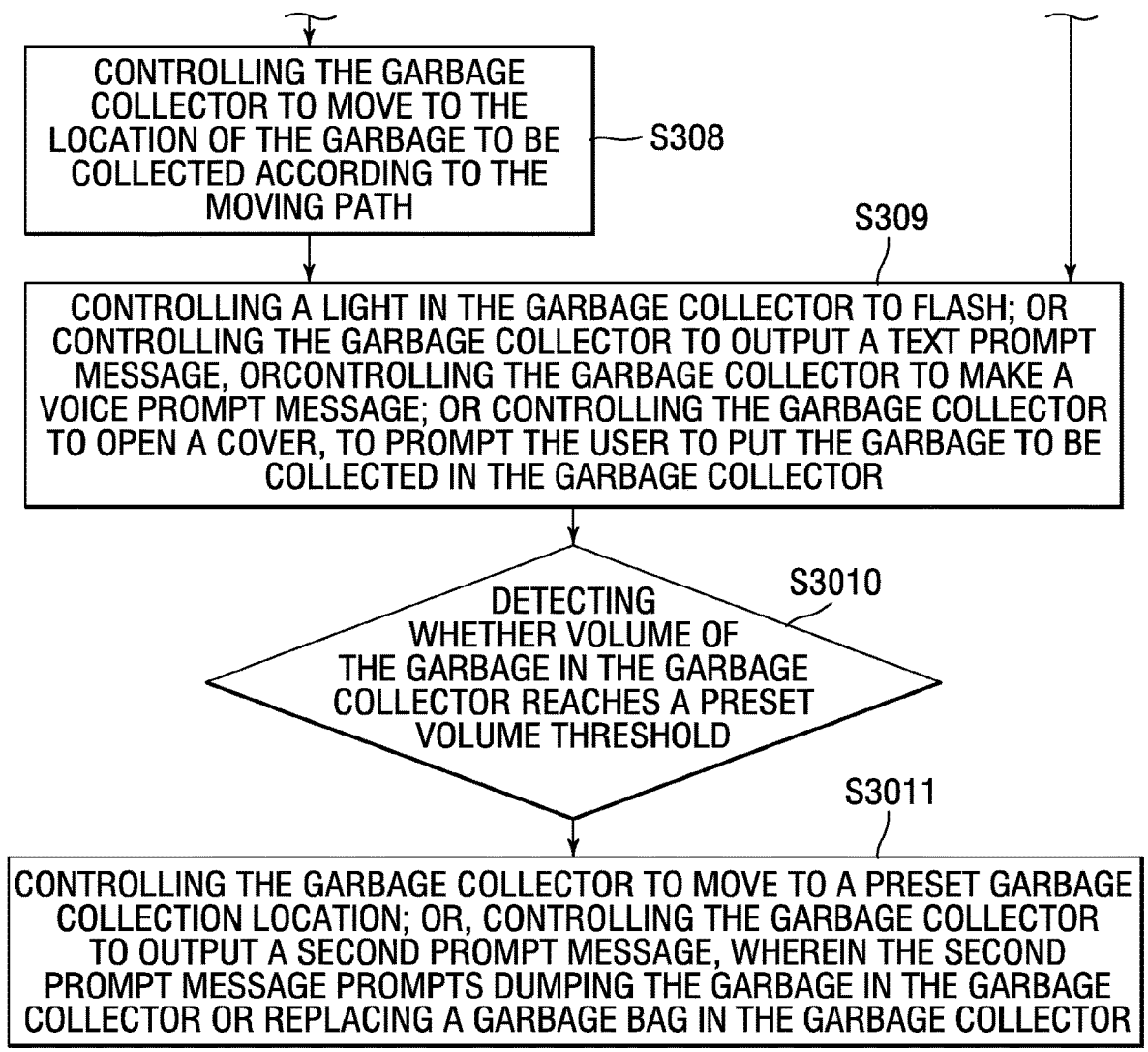

FIGS. 3A and 3B show a flow chart illustrating a method for recycling garbage according to an exemplary aspect. As shown in FIGS. 3A and 3B, the method includes the following steps.

In S301, an image including the garbage to be collected is acquired.

In S302, the garbage type of the garbage to be collected in the image is identified through an image recognition algorithm.

In S303, a garbage collector for recycling garbage of the garbage type is determined.

In S304, a location of the garbage to be collected is acquired.

In S305, a current location of the garbage collector is acquired.

In S306, it is detected whether a distance between the location of the garbage to be collected and the current location of the garbage collector is greater than a preset distance threshold, when detecting that the distance between the location of the garbage to be collected and the current location of the garbage collector is greater than the preset distance threshold, steps S307-S309 are performed; and when detecting that the distance between the location of the garbage to be collected and the current location of the garbage collector is less than or equal to the preset distance threshold, step S309 is performed.

In S307, a moving path of the garbage collector is determined according to the current location of the garbage collector and the location of the garbage to be collected.

In S308, the garbage collector is controlled to move to the location of the garbage to be collected according to the moving path.

In S309, the light in the garbage collector is controlled to flash; or the garbage collector is controlled to output a text prompt message; or the garbage collector is controlled to make a voice prompt message; or the garbage collector is controlled to open the cover, to prompt the user to put the garbage to be collected in the garbage collector.

In S3010, it is detected whether volume of the garbage in the garbage collector reaches a preset volume threshold, when the volume of the garbage in the garbage collector reaches the preset volume threshold, step S3011 is performed.

In S3011, the garbage collector is controlled to move to a preset garbage collection location; or the garbage collector is controlled to output a second prompt message, and the second prompt message prompts dumping the garbage in the garbage collector or replacing the garbage bag in the garbage collector.

The following is a device of the present disclosure and may be used to perform the method of the present disclosure.

Figure 4:
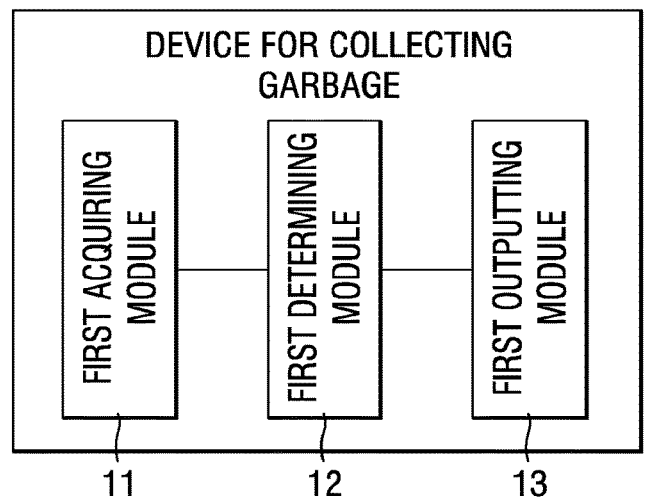
FIG. 4 is a block diagram illustrating a device for collecting garbage according to an exemplary aspect of the present disclosure.
Figure 5:
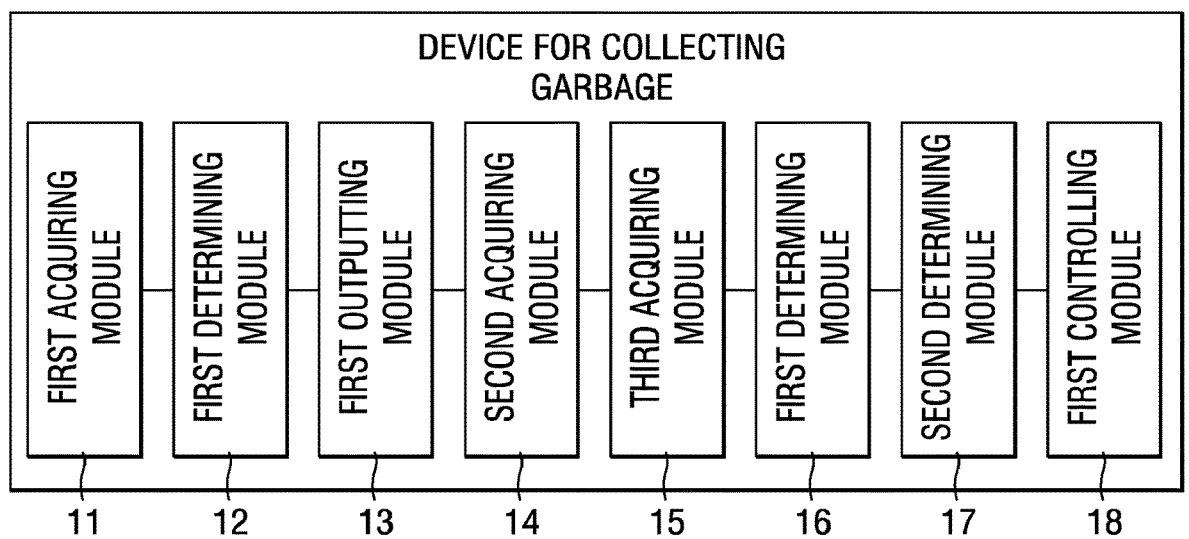
FIG. 5 is a block diagram illustrating a device for collecting garbage according to an exemplary aspect of the present disclosure.

FIG. 4 is a block diagram illustrating a device for collecting garbage according to an exemplary aspect. The device can be implemented as part or all of an electronic device by software, hardware, or a combination of both. As shown in FIG. 4, the device for collecting garbage includes: a first acquiring module 11, a first determining module 12 and a first outputting module 13.

The first acquiring module 11 is configured to acquire a garbage type of garbage to be collected.

The first determining module 12 is configured to determine a garbage collector for recycling garbage of the garbage type acquired by the first acquiring module 11.

The first outputting module 13 is configured to control the garbage collector to output a first prompt message to prompt a user to put the garbage to be collected into the garbage collector determined by the first determining module 12.

In an aspect, as shown in FIG. 15, the device further includes: a second acquiring module 14, a third acquiring module 15, a first detecting module 16, a second determining module 17 and a first controlling module 18.

The second acquiring module 14 is configured to acquire a location of the garbage to be collected before the first outputting module 13 controls the garbage collector to output a first prompt message.

The third acquiring module 15 is configured to acquire a current location of the garbage collector.

The first detecting module 16 is configured to detect whether a distance between the location of the garbage to be collected acquired by the second acquiring module 14 and the current location of the garbage collector acquired by the third acquiring module 15 is greater than a preset distance threshold.

The second determining module 17 is configured to, when the first detecting module 16 detects that the distance between the location of the garbage to be collected acquired by the second acquiring module 14 and the current location of the garbage collector acquired by the third acquiring module 15 is greater than the preset distance threshold, determine a moving path of the garbage collector according to the current location of the garbage collector and the location of the garbage to be collected.

The first controlling module 18 is configured to control the garbage collector to move to the location of the garbage to be collected according to the moving path determined by the second determining module 17.

Figure 6:
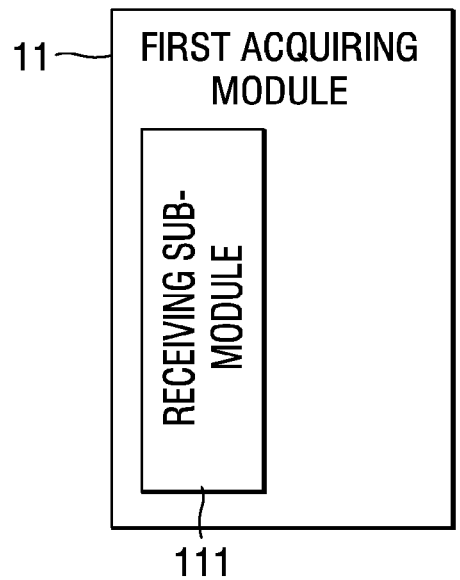
FIG. 6 is a block diagram illustrating a first acquiring module in a device for collecting garbage according to an exemplary aspect of the present disclosure.

In an aspect, as shown in FIG. 6, the first acquiring module 11 includes a receiving sub-module 111. The receiving sub-module 111 is configured to receive an indication message, the indication message carrying the garbage type of the garbage to be collected.

Figure 7:
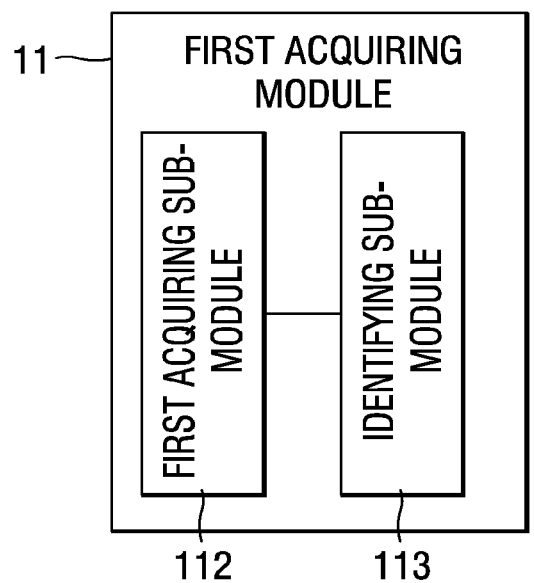
FIG. 7 is a block diagram of a first acquiring module in a device for collecting garbage, according to an exemplary aspect of the present disclosure.

In an aspect, as shown in FIG. 7, the first acquiring module 11 further includes a first acquiring sub-module 112 and an identifying sub-module 113.

The first acquiring sub-module 112 is configured to acquire an image including the garbage to be collected.

The identifying sub-module 113 is configured to identify, through an image recognition algorithm, the garbage type of the garbage to be collected in the image acquired by the first acquiring sub-module 112.

Figure 8:
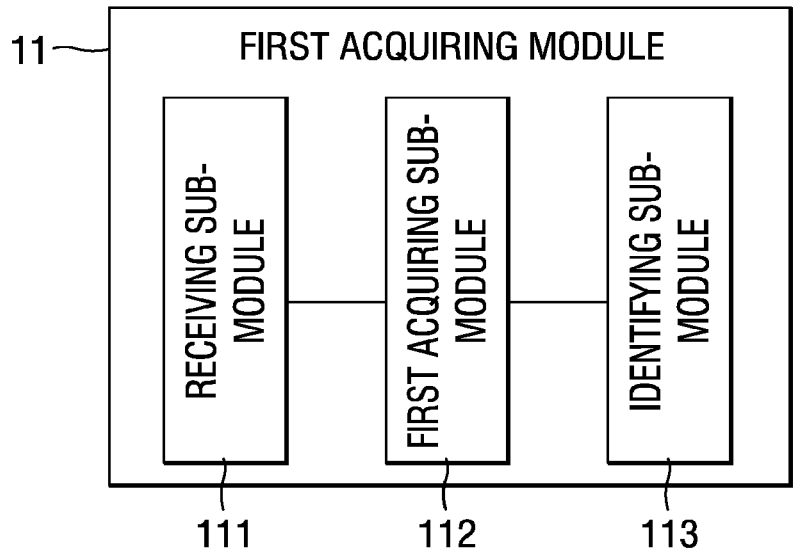
FIG. 8 is a block diagram of a first acquiring module in a device for collecting garbage according to an exemplary aspect of the present disclosure.

In an aspect, as shown in FIG. 8, the first acquiring module 11 includes a receiving sub-module 111. The receiving sub-module 111 is configured to receive an indication message, the indication message carrying the garbage type of the garbage to be collected.

Also, the first acquiring module 11 further includes a first acquiring sub-module 112 and an identifying sub-module 113.

The first acquiring sub-module 112 is configured to acquire an image including the garbage to be collected.

The identifying sub-module 113 is configured to identify, through an image recognition algorithm, the garbage type of the garbage to be collected in the image acquired by the first acquiring sub-module 112.

Figure 9:
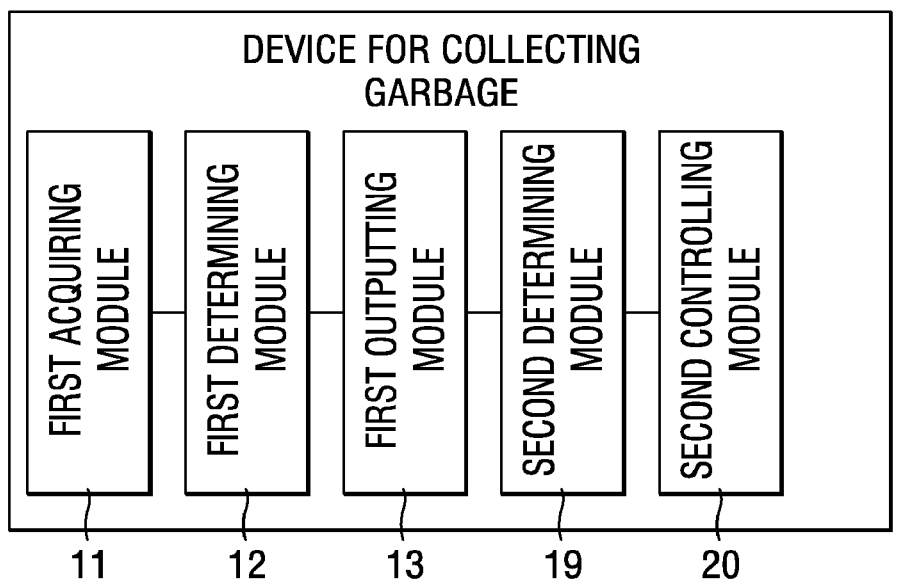
FIG. 9 is a block diagram of a device for collecting garbage according to an exemplary aspect of the present disclosure.

As shown in FIG. 9, the device further includes: a second detecting module 19 and a second controlling module 20.

The second detecting module 19 is configured to detect whether garbage in the garbage collector satisfies a preset cleaning condition.

The second controlling module 20 is configured to, when the second detecting module 19 detects that the garbage in the garbage collector satisfies a preset cleaning condition, control the garbage collector to move to a preset garbage collection location; and/or, control the garbage collector to output a second prompt message, the second prompt message prompting dumping the garbage in the garbage collector or replacing a garbage bag in the garbage collector.

Figure 10:
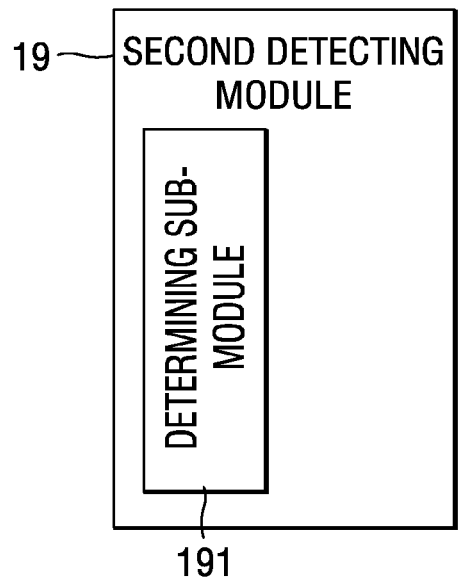
FIG. 10 is a block diagram of a second detecting module in a device for collecting garbage according to an exemplary aspect of the present disclosure.

In an aspect, as shown in FIG. 10, the second detecting module 19 includes: a determining sub-module 191.

The determining sub-module 191 is configured to, when weight of the garbage in the garbage collector reaches a preset weight threshold, and/or volume of the garbage in the garbage collector reaches a preset volume threshold, determine that the garbage in the garbage collector satisfies the preset cleaning condition.

Figure 11:
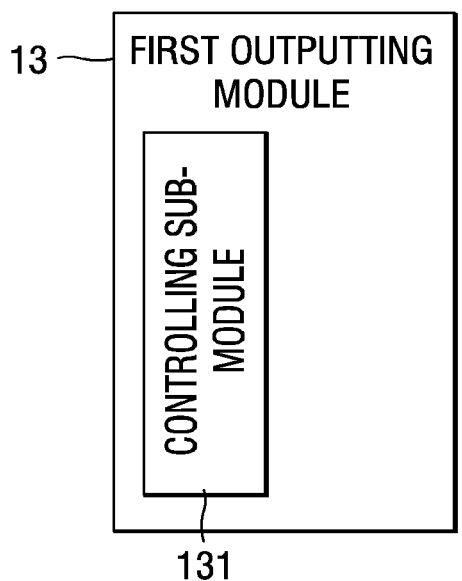
FIG. 11 is a block diagram of a first outputting module in a device for collecting garbage according to an exemplary aspect of the present disclosure.

In an aspect, as shown in FIG. 11, the first outputting module 13 includes: a controlling sub-module 131.

The controlling sub-module 131 is configured to control the garbage collector to output a first prompt message. Controlling the garbage collector to output a first prompt message includes one or more of:

controlling a light in the garbage collector to flash; or controlling the garbage collector to output a text prompt message; or controlling the garbage collector to make a voice prompt message; or controlling the garbage collector to open a cover.

Figure 12:
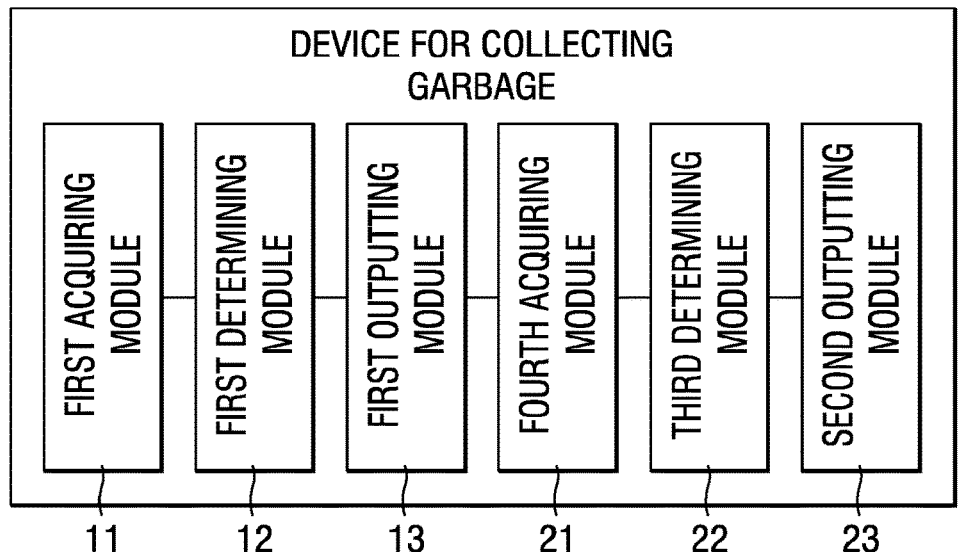
FIG. 12 is a block diagram of a device for collecting garbage according to an exemplary aspect of the present disclosure.

In an aspect, as shown in FIG. 12, the device further includes: a fourth acquiring module 21, a third determining module 22 and a second outputting module 23.

The fourth acquiring module 21 is configured to acquire a frequency of the user using the garbage collector through a preset deep learning model and according to a frequency of outputting the first prompt message.

The third determining module 22 is configured to determine a time point at which a third prompt message is to be output according to the frequency of the user using the garbage collector acquired by the fourth acquiring module 21, the third prompt message prompting the user to purchase a garbage bag.

The second outputting module 23 is configured to, when detecting that the time point determined by the third determining module 22 has been reached, output the third prompt message.

According to a third aspect of the present disclosure, there is provided a device for collecting garbage, including:
 a processor; and
 a memory for storing instructions executable by the processor,
 wherein the processor is configured to:
 acquire a garbage type of garbage to be collected;

determine a garbage collector for recycling garbage of the garbage type; and control the garbage collector to output a first prompt message to prompt a user to put the garbage to be collected into the garbage collector.

The processor is further configured to, prior to controlling the garbage collector to output a first prompt message, acquire a location of the garbage to be collected;

acquire a current location of the garbage collector;

when detecting that a distance between the location of the garbage to be collected and the current location of the garbage collector is greater than a preset distance threshold, determine a moving path of the garbage collector according to the current location of the garbage collector and the location of the garbage to be collected; and control the garbage collector to move to the location of the garbage to be collected according to the moving path.

Acquiring a garbage type of garbage to be collected includes:

receiving an indication message, the indication message carrying the garbage type of the garbage to be collected; and/or, acquiring an image including the garbage to be collected; and identifying, through an image recognition algorithm, the garbage type of the garbage to be collected in the image.

The device is further configured to:

when detecting that garbage in the garbage collector satisfies a preset cleaning condition, control the garbage collector to move to a preset garbage collection location; and/or, control the garbage collector to output a second prompt message, the second prompt message prompting dumping the garbage in the garbage collector or replacing a garbage bag in the garbage collector.

Detecting that garbage in the garbage collector satisfies a preset cleaning condition includes:

when weight of the garbage in the garbage collector reaches a preset weight threshold, and/or volume of the garbage in the garbage collector reaches a preset volume threshold, determining that the garbage in the garbage collector satisfies the preset cleaning condition.

Controlling the garbage collector to output a first prompt message includes one or more of:

controlling a light in the garbage collector to flash; or controlling the garbage collector to output a text prompt message; or controlling the garbage collector to make a voice prompt message; or controlling the garbage collector to open a cover.

The device is further configured to:

acquire a frequency of the user using the garbage collector through a preset deep learning model and according to a frequency of outputting the first prompt message;

determine a time point at which a third prompt message is to be output according to the frequency of the user using the garbage collector, the third prompt message prompting the user to purchase a garbage bag; and when detecting that the time point has been reached, output the third prompt message.

With regard to the devices in the above aspects, the specific manner in which the respective modules perform the operations has been described in detail in the aspect relating to the method, and will not be explained in detail herein.

Figure 13:
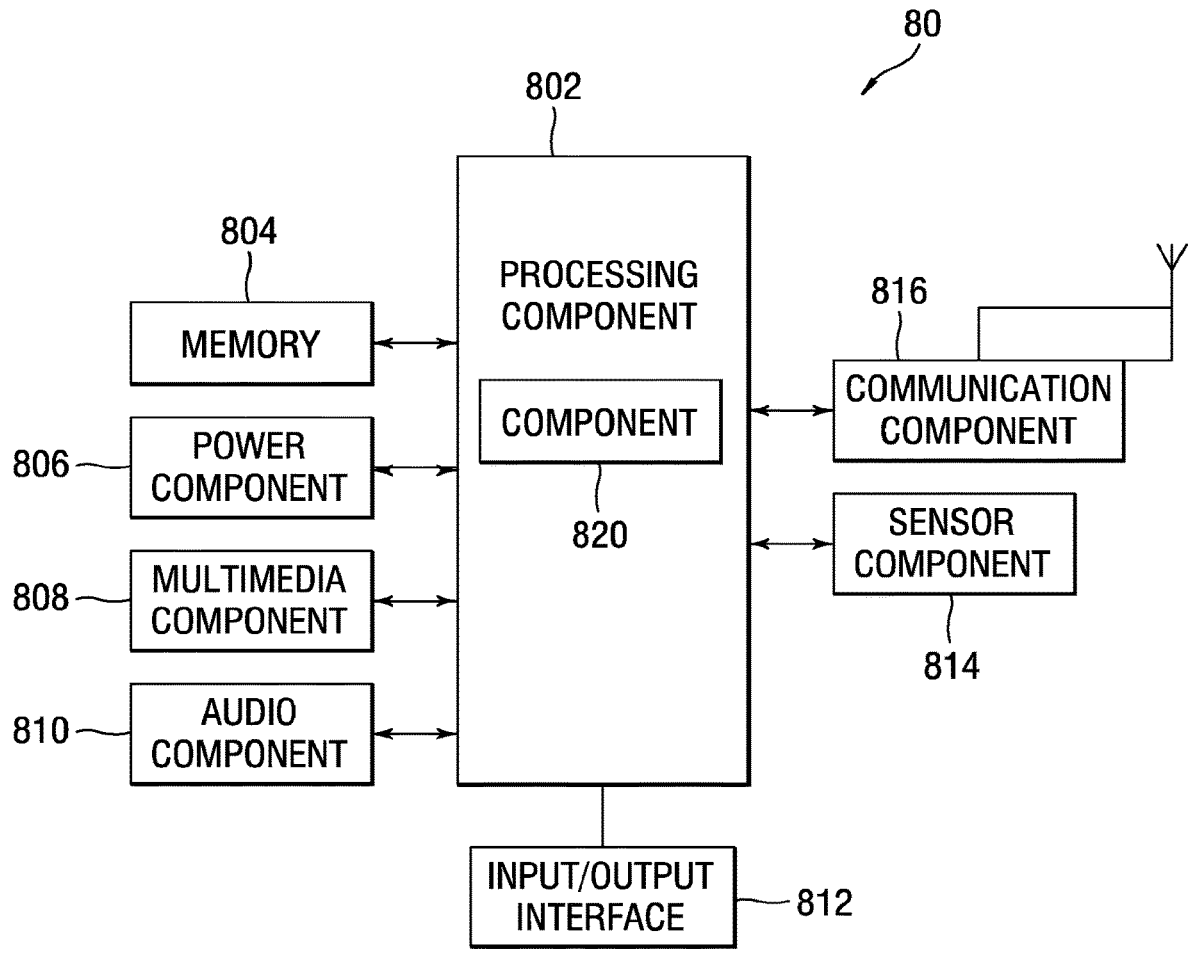
FIG. 13 is a block diagram of a device 80 for collecting garbage according to an exemplary aspect of the present disclosure.

FIG. 13 is a block diagram of a device 80 for collecting garbage according to an exemplary aspect.

The device 80 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 80, such as the operations associated with display, telephone calls, data communications, camera operations, and recording operations. The processing component 802 may include one or more processors 820 to execute instructions, to perform all or part of the steps of the above method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 80. Examples of such data include instructions for any applications or methods operated on the device 80, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 80. The power component 806 may include a power management system, one or more power sources, and any other components associated with the generation, management, and distribution of power in the device 80.

The multimedia component 808 includes a screen providing an output interface between the device 80 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and the rear camera may receive an external multimedia datum while the device 80 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 80 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes one or more sensors to provide status assessments of various aspects of the device 80. For instance, the sensor component 814 may detect an open/closed status of the device 80, relative positioning of components, e.g., the display and the keypad, of the device 80, a change in position of the device 80 or a component of the device 80, a presence or absence of user contact with the device 80, an orientation or an acceleration/deceleration of the device 80, and a change in temperature of the device 80. The sensor component 814 may include a proximity sensor configured to detect the presence of nearby objects without any physical contact. The sensor component 814 may also include a light sensor, such as a CMOS or CCD image sensor, for use in imaging applications. In some aspects, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 80 and other devices. The device 80 can access a wireless network based on a communication standard, such as WiFi, 2G, or 3G, or a combination thereof. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method.

In exemplary aspects, there is also provided a non-transitory computer-readable storage medium including instructions, such as included in the memory 804, executable by the processor 820 in the device 80 to perform the above method. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by the processor of the device 80, causes the device 80 to perform the above method for collecting garbage. The method includes:

acquiring a garbage type of garbage to be collected;

determining a garbage collector for recycling garbage of the garbage type; and controlling the garbage collector to output a first prompt message to prompt a user to put the garbage to be collected into the garbage collector.

Prior to controlling the garbage collector to output a first prompt message, the method further including:

acquiring a location of the garbage to be collected;

acquiring a current location of the garbage collector;

when detecting that a distance between the location of the garbage to be collected and the current location of the garbage collector is greater than a preset distance threshold, determining a moving path of the garbage collector according to the current location of the garbage collector and the location of the garbage to be collected; and controlling the garbage collector to move to the location of the garbage to be collected according to the moving path.

Acquiring a garbage type of garbage to be collected includes:

receiving an indication message, the indication message carrying the garbage type of the garbage to be collected;

and/or, acquiring an image including the garbage to be collected; and identifying, through an image recognition algorithm, the garbage type of the garbage to be collected in the image.

The method further includes:

when detecting that garbage in the garbage collector satisfies a preset cleaning condition, controlling the garbage collector to move to a preset garbage collection location;

and/or, controlling the garbage collector to output a second prompt message, the second prompt message prompting dumping the garbage in the garbage collector or replacing a garbage bag in the garbage collector.

Detecting that garbage in the garbage collector satisfies a preset cleaning condition includes:

when weight of the garbage in the garbage collector reaches a preset weight threshold, and/or volume of the garbage in the garbage collector reaches a preset volume threshold, determining that the garbage in the garbage collector satisfies the preset cleaning condition.

Controlling the garbage collector to output a first prompt message includes one or more of:

controlling a light in the garbage collector to flash; or controlling the garbage collector to output a text prompt message; or controlling the garbage collector to make a voice prompt message; or controlling the garbage collector to open a cover.

The method further includes:

acquiring a frequency of the user using the garbage collector through a preset deep learning model and according to a frequency of outputting the first prompt message;

determining a time point at which a third prompt message is to be output according to the frequency of the user using the garbage collector, the third prompt message prompting the user to purchase a garbage bag; and when detecting that the time point has been reached, outputting the third prompt message.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for collecting garbage, comprising:
   acquiring a garbage type of garbage to be collected;
   determining a garbage collector for recycling garbage of the garbage type;
   controlling the garbage collector to output a first prompt message to prompt a user to put the garbage to be collected into the garbage collector;
   when detecting that garbage in the garbage collector satisfies a preset cleaning condition, controlling the garbage collector to move to a preset garbage collection location, and/or controlling the garbage collector to output a second prompt message, wherein the second prompt message prompts dumping the garbage in the garbage collector or replacing a garbage bag in the garbage collector;
   acquiring a frequency of the user using the garbage collector, through a preset deep learning model and based on a frequency of outputting the first prompt message;
   determining a time point at which a third prompt message is to be output based on the frequency of the user using the garbage collector, the third prompt message prompting the user to purchase a garbage bag; and
   when detecting that the time point has been reached, outputting the third prompt message.

2. The method according to claim 1, wherein, prior to controlling the garbage collector to output the first prompt message, the method further comprises:
   acquiring a location of the garbage to be collected;
   acquiring a current location of the garbage collector;
   determining a distance between the location of the garbage to be collected and the current location of the garbage collector;
   when the distance between the location of the garbage to be collected and the current location of the garbage collector is determined to be greater than a preset distance threshold, determining a moving path of the garbage collector based on the current location of the garbage collector and the location of the garbage to be collected; and
   controlling the garbage collector to move to the location of the garbage to be collected based on the moving path.

3. The method according to claim 1, wherein acquiring the garbage type of the garbage to be collected comprises:
   receiving an indication message that includes the garbage type of the garbage to be collected; and/or
   acquiring an image including the garbage to be collected, and identifying, through an image recognition algorithm, the garbage type of the garbage to be collected in the image.

4. The method according to claim 1, wherein detecting that the garbage in the garbage collector satisfies the preset cleaning condition comprises:
   when weight of the garbage in the garbage collector reaches a preset weight threshold, and/or volume of the garbage in the garbage collector reaches a preset volume threshold, determining that the garbage in the garbage collector satisfies the preset cleaning condition.

5. The method according to claim 1, wherein controlling the garbage collector to output the first prompt message comprises one or more of controlling a light in the garbage collector to flash, controlling the garbage collector to output a text prompt message, controlling the garbage collector to make a voice prompt message, and/or controlling the garbage collector to open a cover.

6. A device for collecting garbage, comprising:
   a processor; and
   a memory for storing instructions executable by the processor,
   wherein the processor is configured to:
   acquire a garbage type of garbage to be collected;
   determine a garbage collector for recycling garbage of the garbage type;
   control the garbage collector to output a first prompt message to prompt a user to put the garbage to be collected into the garbage collector;
   when detecting that garbage in the garbage collector satisfies a preset cleaning condition, control the garbage collector to move to a preset garbage collection location, and/or control the garbage collector to output a second prompt message wherein the second prompt message prompts dumping the garbage in the garbage collector or replacing a garbage bag in the garbage collector;
   acquire a frequency of the user using the garbage collector, through a preset deep learning model and based on a frequency of outputting the first prompt message;
   determine a time point at which a third prompt message is to be output based on the frequency of the user using the garbage collector, the third prompt message prompting the user to purchase a garbage bag; and
   when detecting that the time point as been reached, output the third prompt message.

7. The device according to claim 6, wherein, prior to controlling the garbage collector to output the first prompt message, the processor is further configured to:
   acquire a location of the garbage to be collected;
   acquire a current location of the garbage collector;
   determine a distance between the location of the garbage to be collected and the current location of the garbage collector;
   when the distance between the location of the garbage to be collected and the current location of the garbage collector is determined to be greater than preset distance threshold, determine a moving path of the garbage collector based on the current location of the garbage collector and the location of the garbage to be collected; and
   control the garbage collector to move to the location of the garbage to be collected based on the moving path.

8. The device according to claim 6, wherein, when acquiring the garbage type of the garbage, the processor is further configured to:
   receive an indication message that includes the garbage type of the garbage to be collected; and/or
   acquire an image including the garbage to be collected, and identify, through an image recognition algorithm, the garbage type of the garbage to be collected in the image.

9. The device according to claim 6, wherein, when detecting that the garbage in the garbage collector satisfies the preset cleaning condition, the processor is further configured to:
when weight of the garbage in the garbage collector reaches a preset weight threshold, and/or volume of the garbage in the garbage collector reaches a preset volume threshold, determine that the garbage in the garbage collector satisfies the preset cleaning condition.

10. The device according to claim 6, wherein, when controlling the garbage collector to output the first prompt message, the processor is further configured to control a light in the garbage collector to flash, control the garbage collector to output a text prompt message, control the garbage collector to make a voice prompt message, and/or control the garbage collector to open a cover.

11. A non-transitory computer-readable medium storing instructions that, when executed by one or more processors of a device, cause the device to:
acquire a garbage type of garbage to be collected;
determine a garbage collector for recycling garbage of the garbage type;
control the garbage collector to output a first prompt message to prompt a user to put the garbage to be collected into the garbage collector;
when detecting that garbage in the garbage collector satisfies a preset cleaning condition, control the garbage collector to move to a preset garbage collection location, and/or control the garbage collector to output a second prompt message, wherein the second prompt message prompts dumping the garbage in the garbage collector or replacing a garbage bag in the garbage collector;
acquire a frequency of the user using the garbage collector, through a preset deep learning model and based on a frequency of outputting the first prompt message;
determine a time point at which a third prompt message is to be output based on the frequency of the user using the garbage collector, the third prompt message prompting the user to purchase a garbage bag; and
when detecting that the time point has been reached, output the third prompt message.

12. The non-transitory computer-readable medium according to claim 11, wherein prior to controlling the garbage collector to output the first prompt message, the instructions further cause the device to:
acquire a location of the garbage to be collected;
acquire a current location of the garbage collector;
determine a distance between the location of the garbage to be collected and the current location of the garbage collector;
when the distance between the location of the garbage to be collected and the current location of the garbage collector is determined to be greater than a preset distance threshold, determine a moving path of the garbage collector based on the current location of the garbage collector and the location of the garbage to be collected; and
controlling the garbage collector to move to the location of the garbage to be collected based on the moving path.

13. The non-transitory computer-readable medium according to claim 11, wherein, when acquiring the garbage type of the garbage to be collected, the instructions further cause the device to:
receive an indication message that includes the garbage type of the garbage to be collected; and/or
acquire an image including the garbage to be collected, and identify, through an image recognition algorithm, the garbage type of the garbage to be collected in the image.

14. The non-transitory computer-readable medium according to claim 11, wherein, when detecting that the garbage in the garbage collector satisfies the preset cleaning condition, the instructions further cause the device to:
when weight of the garbage in the garbage collector reaches a preset weight threshold, and/or volume of the garbage in the garbage collector aches a preset volume threshold, determine that the garbage in the garbage collector satisfies the preset cleaning condition.

15. The non-transitory computer-readable medium according to claim 11, wherein, when controlling the garbage collector to output a first prompt message, the instructions further cause the device to:
control a light in the garbage collector to flash, control the garbage collector to output a text prompt message, control the garbage collector to make a voice prompt message, and/or control the garbage collector to open a cover.

* * * * *